US012669445B2

(12) United States Patent
Kim

(10) Patent No.: US 12,669,445 B2
(45) Date of Patent: Jun. 30, 2026

(54) HIGH-SPEED AUTOMATIC FILM-FOREIGN SUBSTANCE DETECTION APPARATUS

(71) Applicant: Jin Ho Kim, Suwon-si (KR)

(72) Inventor: Jin Ho Kim, Suwon-si (KR)

( * ) Notice: Subject to any disclaimer, the term of this patent is extended or adjusted under 35 U.S.C. 154(b) by 297 days.

(21) Appl. No.: 18/563,371

(22) PCT Filed: Apr. 7, 2022

(86) PCT No.: PCT/KR2022/005045
§ 371 (c)(1),
(2) Date: Nov. 21, 2023

(87) PCT Pub. No.: WO2022/255623
PCT Pub. Date: Dec. 8, 2022

(65) Prior Publication Data
US 2024/0273707 A1 Aug. 15, 2024

(30) Foreign Application Priority Data
Jun. 2, 2021 (KR) ........................ 10-2021-0071249

(51) Int. Cl.
*G01N 21/94* (2006.01)
*G01N 21/47* (2006.01)
(Continued)

(52) U.S. Cl.
CPC ......... *G01N 21/94* (2013.01); *G01N 21/4738* (2013.01); *G01N 21/95* (2013.01);
(Continued)

(58) Field of Classification Search
CPC ........... G06T 7/0004–001; G06T 7/579; G06T 2207/30108; G06T 2207/30121;
(Continued)

(56) References Cited

FOREIGN PATENT DOCUMENTS

| | | | | |
|---|---|---|---|---|
| JP | 2005098970 A | * | 4/2005 | |
| KR | 10-2011-0046901 A | | 5/2011 | |

(Continued)

*Primary Examiner* — Geoffrey E Summers
(74) *Attorney, Agent, or Firm* — NKL Law; Jae Youn Kim

(57) ABSTRACT
The present invention provides a high-speed automatic film-foreign substance detection apparatus, including: a stage on which a sample is mounted; a plurality of side light units arranged on an upper side surface of the stage to irradiate side light toward a sample during an operation of a low-magnification optical module; a low-magnification optical module installed at an upper side of the stage and generating a low-magnification image by capturing the sample so that the foreign substance can be detected from the sample using the light scattering of the foreign substance by the side light irradiated from the side light unit; a high-magnification optical module installed at one side of the stage, having a high-magnification driving unit installed and connected thereto to drive in directions of an x-axis, a y-axis and a z-axis, and generating a high-magnification image by capturing the sample; and a user device for controlling the operation of the low-magnification optical module and the high-magnification optical module, and receiving, storing, playing and analyzing the low-magnification image and the high-magnification image.

10 Claims, 12 Drawing Sheets

(51) Int. Cl.

| | |
|---|---|
| *G01N 21/88* | (2006.01) |
| *G01N 21/95* | (2006.01) |
| *G06T 7/00* | (2017.01) |
| *G06T 7/579* | (2017.01) |

(52) U.S. Cl.
CPC .............. *G06T 7/001* (2013.01); *G06T 7/579* (2017.01); *G01N 2021/8809* (2013.01); *G01N 2021/8861* (2013.01); *G01N 2021/8887* (2013.01); *G01N 2021/9513* (2013.01); *G06T 2207/30121* (2013.01)

(58) Field of Classification Search
CPC .......... G06T 2207/30164; G01N 21/94; G01N 21/95; G01N 21/958; G01N 2021/9513; G01N 21/88; G01N 21/8806; G01N 21/8851; G01N 2021/8854; G01N 2021/8861; G01N 2021/8867; G01N 2021/887; G01N 2021/8887; G01N 21/4738; G01N 2021/8809
See application file for complete search history.

(56) References Cited

FOREIGN PATENT DOCUMENTS

| | | | | | |
|---|---|---|---|---|---|
| KR | 20130029682 | A | * | 3/2013 | .............. H04N 7/18 |
| KR | 10-2014-0011258 | A | | 1/2014 | |
| KR | 20-2014-0001508 | U | | 3/2014 | |
| KR | 10-2015-0026527 | A | | 3/2015 | |
| KR | 20190100616 | A | * | 8/2019 | ......... G01N 21/8851 |
| KR | 20200052157 | A | * | 5/2020 | .......... G02B 21/248 |
| KR | 10-2021-0020621 | A | | 2/2021 | |

* cited by examiner

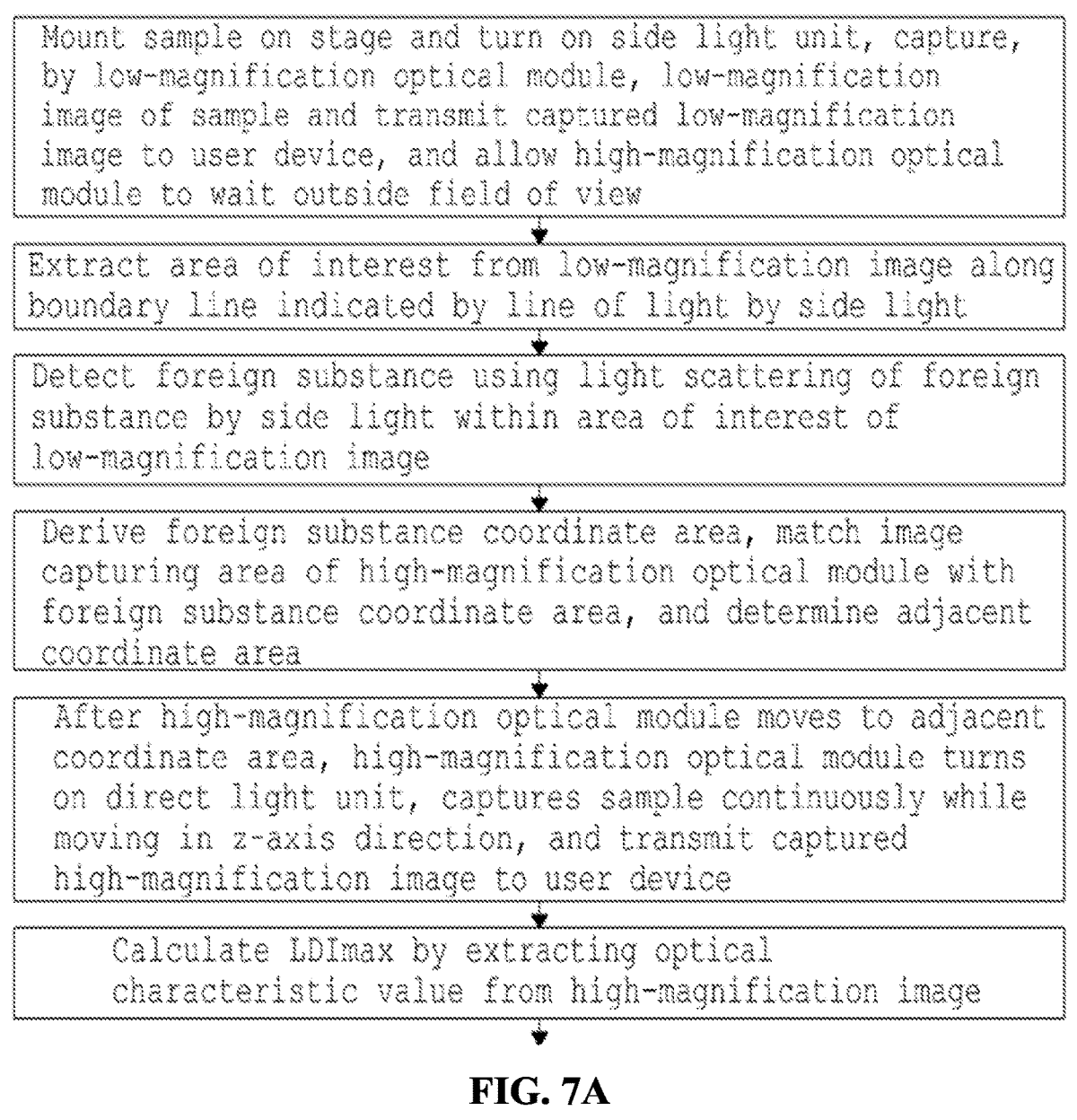

Mount sample on stage and turn on side light unit, capture, by low-magnification optical module, low-magnification image of sample and transmit captured low-magnification image to user device, and allow high-magnification optical module to wait outside field of view Extract area of interest from low-magnification image along boundary line indicated by line of light by side light Detect foreign substance using light scattering of foreign substance by side light within area of interest of low-magnification image Derive foreign substance coordinate area, match image capturing area of high-magnification optical module with foreign substance coordinate area, and determine adjacent coordinate area After high-magnification optical module moves to adjacent coordinate area, high-magnification optical module turns on direct light unit, captures sample continuously while moving in z-axis direction, and transmit captured high-magnification image to user device Calculate LDImax by extracting optical characteristic value from high-magnification image

FIG. 7A

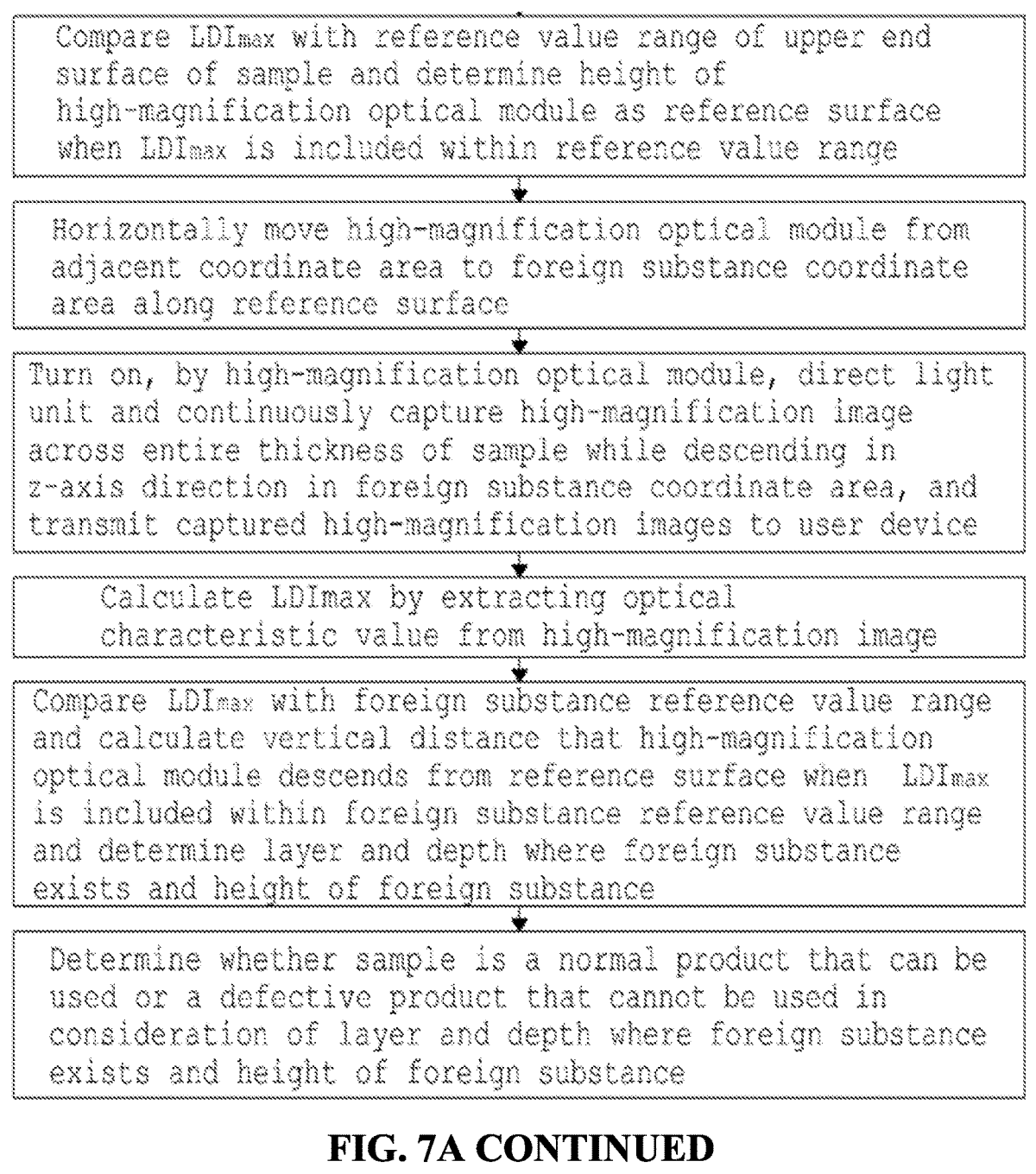

Compare LDImax with reference value range of upper end surface of sample and determine height of high-magnification optical module as reference surface when LDImax is included within reference value range Horizontally move high-magnification optical module from adjacent coordinate area to foreign substance coordinate area along reference surface Turn on, by high-magnification optical module, direct light unit and continuously capture high-magnification image across entire thickness of sample while descending in z-axis direction in foreign substance coordinate area, and transmit captured high-magnification images to user device Calculate LDImax by extracting optical characteristic value from high-magnification image Compare LDImax with foreign substance reference value range and calculate vertical distance that high-magnification optical module descends from reference surface when LDImax is included within foreign substance reference value range and determine layer and depth where foreign substance exists and height of foreign substance Determine whether sample is a normal product that can be used or a defective product that cannot be used in consideration of layer and depth where foreign substance exists and height of foreign substance

FIG. 7A CONTINUED

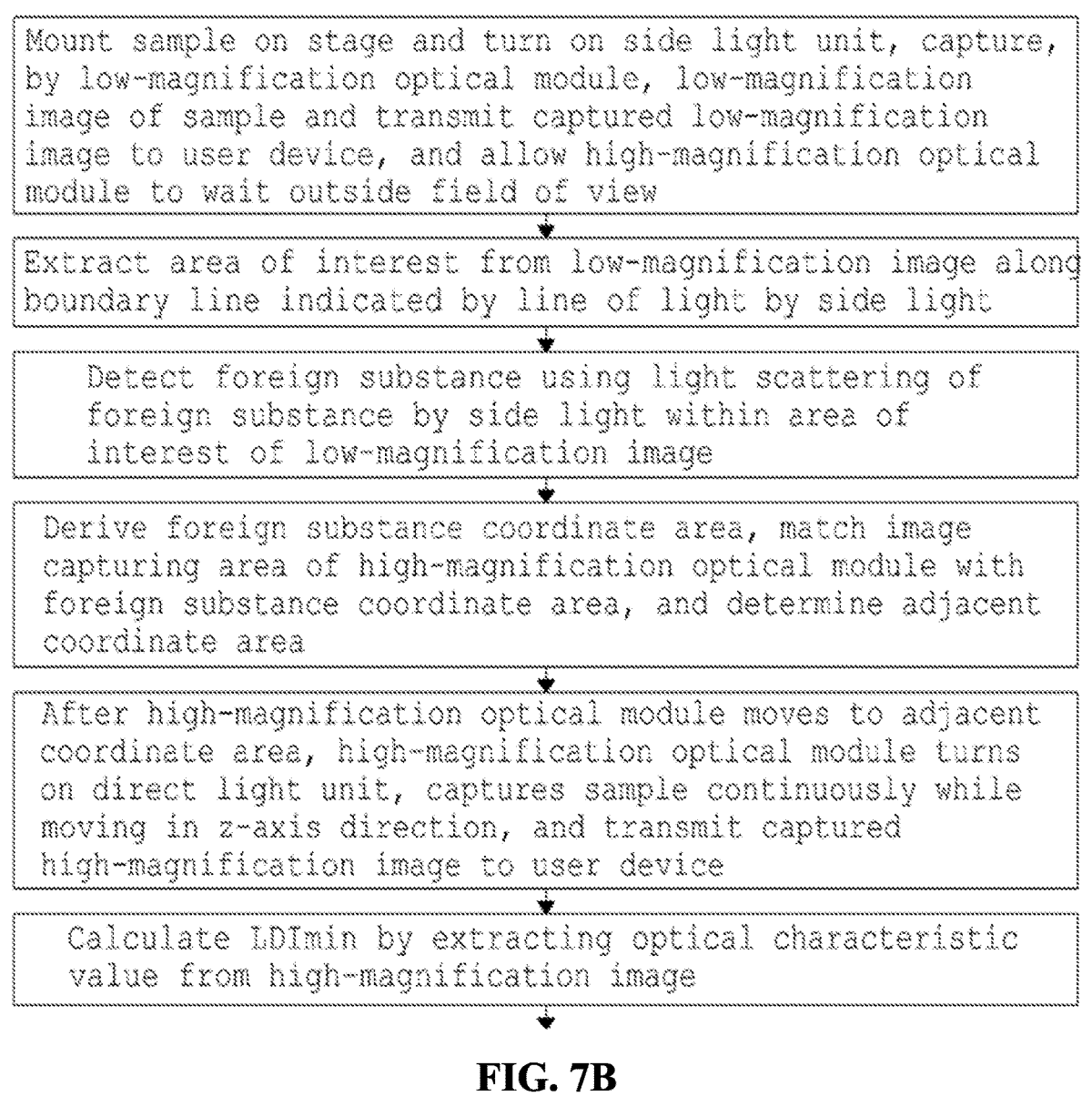

Mount sample on stage and turn on side light unit, capture, by low-magnification optical module, low-magnification image of sample and transmit captured low-magnification image to user device, and allow high-magnification optical module to wait outside field of view Extract area of interest from low-magnification image along boundary line indicated by line of light by side light Detect foreign substance using light scattering of foreign substance by side light within area of interest of low-magnification image Derive foreign substance coordinate area, match image capturing area of high-magnification optical module with foreign substance coordinate area, and determine adjacent coordinate area After high-magnification optical module moves to adjacent coordinate area, high-magnification optical module turns on direct light unit, captures sample continuously while moving in z-axis direction, and transmit captured high-magnification image to user device Calculate LDImin by extracting optical characteristic value from high-magnification image

FIG. 7B

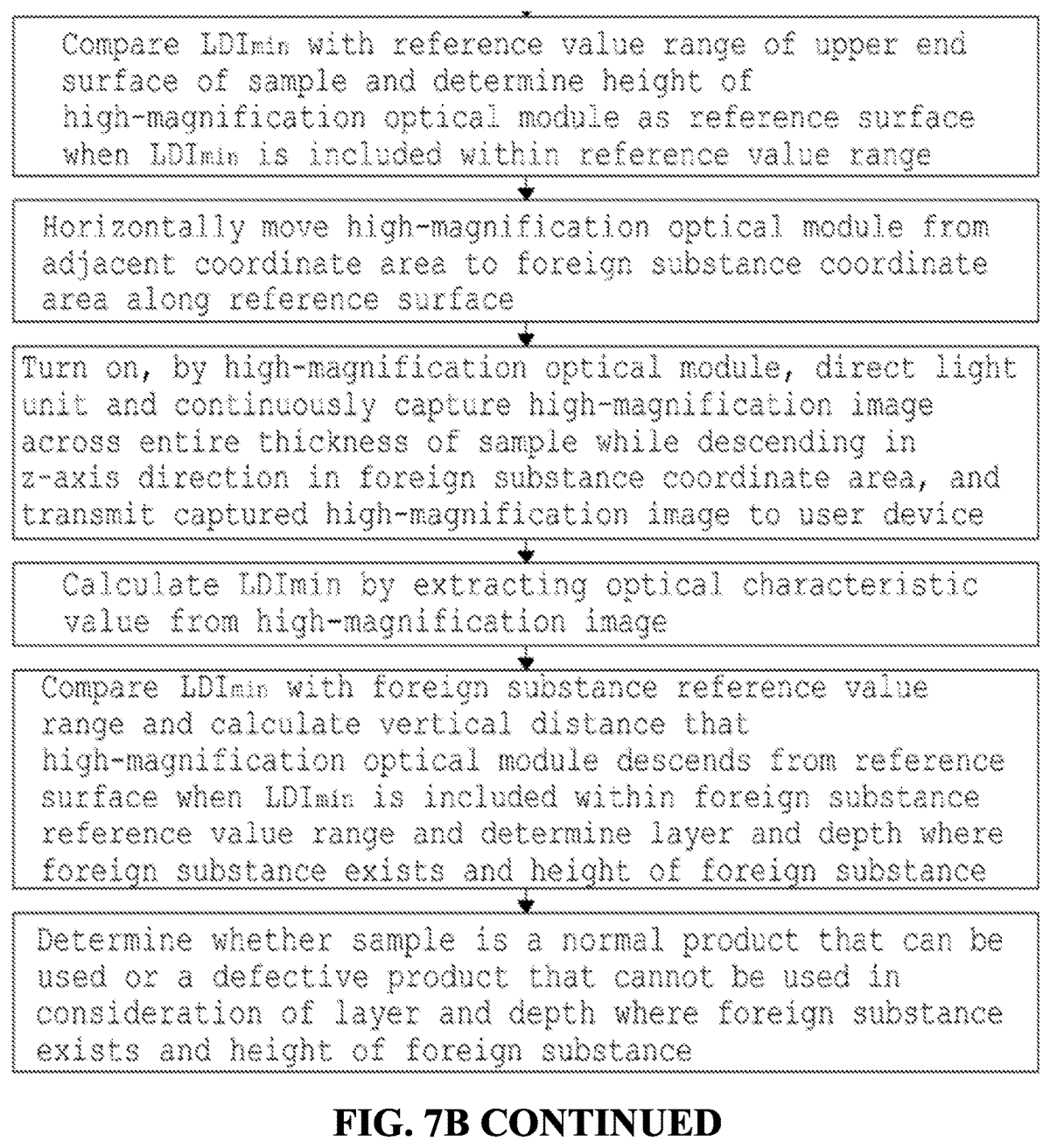

Compare LDImin with reference value range of upper end surface of sample and determine height of high-magnification optical module as reference surface when LDImin is included within reference value range Horizontally move high-magnification optical module from adjacent coordinate area to foreign substance coordinate area along reference surface Turn on, by high-magnification optical module, direct light unit and continuously capture high-magnification image across entire thickness of sample while descending in z-axis direction in foreign substance coordinate area, and transmit captured high-magnification image to user device Calculate LDImin by extracting optical characteristic value from high-magnification image Compare LDImin with foreign substance reference value range and calculate vertical distance that high-magnification optical module descends from reference surface when LDImin is included within foreign substance reference value range and determine layer and depth where foreign substance exists and height of foreign substance Determine whether sample is a normal product that can be used or a defective product that cannot be used in consideration of layer and depth where foreign substance exists and height of foreign substance

FIG. 7B CONTINUED

HIGH-SPEED AUTOMATIC FILM-FOREIGN SUBSTANCE DETECTION APPARATUS

TECHNICAL FIELD

The present invention relates to an apparatus capable of detecting a foreign substance in a film, confirming a shape, a color, a size, an optical characteristic value, etc., of the foreign substance, and determining whether a product can be used by confirming a layer and depth where the foreign substance exists in the sample, and a height of the foreign substance.

BACKGROUND ART

In high-tech industries that include highly precise manufacturing processes at a nano level, even minute environmental conditions may have a significant impact on product quality, so cleanliness required in clean rooms is increasing.

Displays are used in mobile phones, tablet PCs, monitors, home appliances, automotive electronic devices, etc., and are manufactured from an OCA film, a polarizing film, glass, etc. When foreign substances of a certain size or more exist in the displays, pixel defects may occur or image quality characteristics may deteriorate.

In the conventional optical device, a plurality of objective lenses with different magnifications are selected by rotating a rotation plate to generate a low-magnification image and a high-magnification image, respectively. Therefore, in the conventional optical device, approximate positions of foreign substances are identified in the entire image with a low-magnification objective lens, and then an area where the foreign substances are detected is found again by the high-magnification objective lens to perform precise observation. In the conventional optical device, the low-magnification objective lens should be switched to the high-magnification objective lens for precise observation, and an area where foreign substances in the sample are detected should be found to align the high-magnification objective lens with the area where the foreign substances in the sample are detected, so it takes a lot of time and there are troublesome problems.

Korean Laid-Open Patent Publication No. 10-2020-0052157 (published on May 14, 2020) discloses a digital microscope including a stage on which a sample is mounted, a low-magnification optical module that captures a sample to generate a low-magnification image, a high-magnification optical module that captures the sample to generate a high-magnification image and is located on an opposite side of the low-magnification optical module, a driving module that moves the high-magnification optical module, and a user device that plays a low-magnification image and a high-magnification image, wherein an image capturing area of the high-magnification optical module is changed by driving a driving module.

However, since the above-described related art uses direct light, it is not easy to detect small-sized foreign substances in the low-magnification image, it takes a lot of detection time, and it is not easy to identify the layer and depth where the foreign substance exists in the sample, the height of the foreign substance, etc. In other words, a multi-layered sample made of an OCA film, etc. used in display products includes a base layer and a protective layer adhered to both sides of the base layer. When the foreign substances are included in the base layer, product defects occur, but since a protective layer is removed when used later, even if there are foreign substances in the protective layer, the sample may be used as a normal product. However, in the above-described related art, even if foreign substances are detected by the low-magnification optical module, since the layer or depth of the foreign substances existing in the sample may not be confirmed by the high-magnification optical module, the protective layer on an outer surface is removed and then the remaining sample should be observed again by the optical module to confirm which layer the foreign substance exists. However, during this process, the sample is destroyed or damaged, causing loss due to the inspection, so it is not only impossible to conduct a complete inspection, but also foreign substances may be attached and contaminated from an operator or equipment when the operator removes the protective layer, and it is not possible to accurately determine the depth where the foreign substance exists in the sample and the height of the sample itself. Therefore, when the foreign substances are detected in the sample, there is a problem that the entire sample should be discarded.

DISCLOSURE

Technical Problem

The present invention provides a high-speed automatic film-foreign substance detection apparatus that can easily detect the foreign substance included in a sample using a light scattering image captured by a low-magnification optical module, confirm the shape, color, size and optical characteristic values of the foreign substance by moving a high-magnification optical module to a foreign substance coordinate area of the sample, quickly determine whether a product can be used by confirming a layer and depth where the foreign substance exists in the sample, and a height of the foreign substance without destroying and damaging the sample, and identify a kind of foreign substances by connecting a foreign substance analyzer.

Technical Solution

According to an aspect of the present invention, a high-speed automatic film-foreign substance detection apparatus includes: a stage on which a sample is mounted; a plurality of side light units arranged on an upper side surface of the stage to irradiate side light toward a sample during an operation of a low-magnification optical module; a low-magnification optical module installed at an upper side of the stage and generating a low-magnification image by capturing the sample so that the foreign substance can be detected from the sample using the light scattering of the foreign substance by the side light irradiated from the side light unit; a high-magnification optical module installed at one side of the stage, having a high-magnification driving unit installed and connected thereto to drive in the directions of an x-axis, a y-axis and a z-axis, and generating a high-magnification image by capturing the sample with direct light; and a user device for controlling the operation of the low-magnification optical module and the high-magnification optical module, and receiving, storing, playing and analyzing the low-magnification image and the high-magnification image.

Advantageous Effects

According to the present invention, it is possible to easily detect foreign substance included in a sample using a light scattering image captured by a low-magnification optical module, confirm the shape, color, size and optical characteristic values of the foreign substance by moving a high-magnification optical module to a foreign substance coordinate area of the sample, quickly determine whether a product can be used by confirming a layer and depth where the foreign substance exists in the sample, and the height of the foreign substance without destroying or damaging the sample, and identify a kind of foreign substance by connecting a foreign substance analyzer.

DESCRIPTION OF DRAWINGS

FIGS. 7A and 7B are flow charts illustrating a process of detecting and analyzing foreign substances in a sample according to an embodiment of the present invention.

MODE FOR INVENTION

Figure 1:
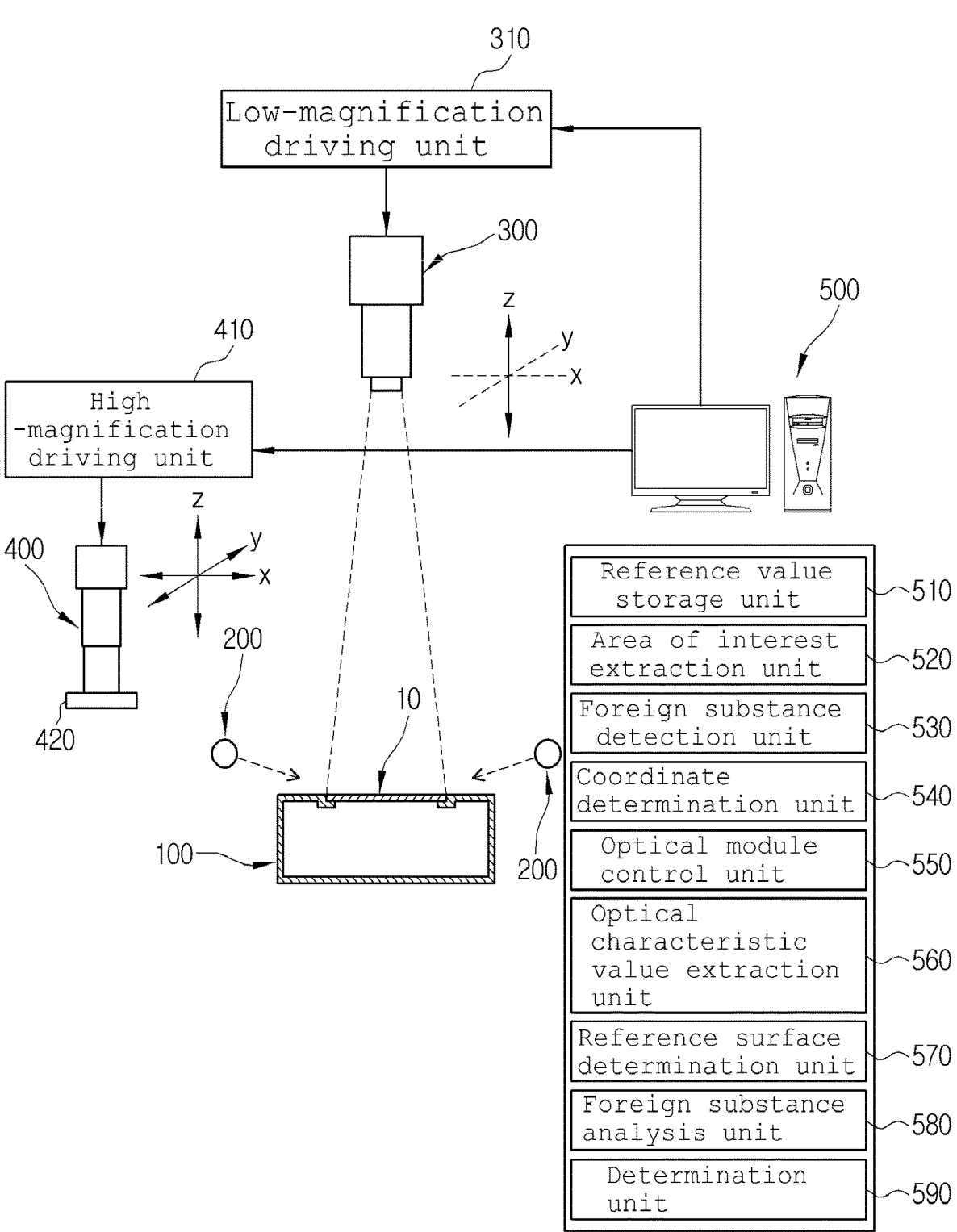
FIG. 1 is a diagram illustrating a configuration of an apparatus according to the present invention.

Referring to FIG. 1, a high-speed automatic film-foreign substance detection apparatus of the present invention includes a stage 100, a side light unit 200, a low-magnification optical module 300, a high-magnification optical module 400, and a user device 500, and may further include a foreign substance type analyzer (not shown).

The stage 100 provides a mounting surface so that a sample 10 made of a film may be mounted on an upper portion, and is provided under a side light unit 200. In this case, the sample 10 may be a transparent or translucent single-layer film or multi-layer film. For example, the stage 100 may be shaped like a cube or a cylinder with a hollow interior, and may have a mounting groove provided on an upper surface on which the sample 10 is mounted, in which the mounting groove may be formed with a through hole.

Figure 2:
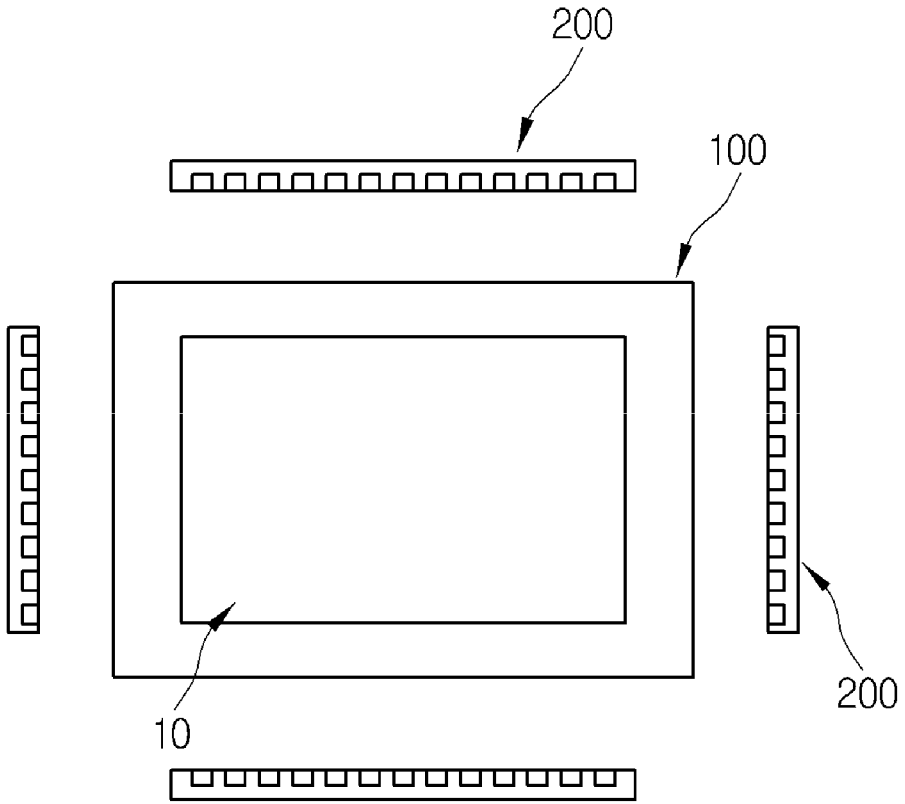
FIG. 2 is a plan view illustrating an arrangement configuration of a side light unit according to the present invention.

Referring to FIG. 2, a plurality of side light units 200 are arranged on an upper side surface of the stage 100, and irradiate side light toward the sample 10 when the low-magnification optical module 300 operates. The side light unit 200 irradiates the side light toward the sample 10 mounted on the stage 100 so that the low-magnification optical module 300 detects the light reflected by foreign substances and detects the foreign substances contained in the sample. As the side light unit 200, LED, laser, etc., may be applied.

The side light unit 200 preferably has a light irradiation angle of 5° to 45° with respect to the sample 10. When the side light irradiated from the side light unit 200 is reflected by foreign substances, the light scattering, which causes light to spread, may occur to increase a detection size where an image sensor of the low-magnification optical module 300 may accept, thereby increasing detection power. The foreign substances may be easily and quickly detected and confirmed from the low-magnification image captured by the low-magnification optical module 300, and the foreign substance having a size smaller than the detectable size and the foreign substance that does not reflect light well may also be detected by the low-magnification optical module 300.

Figure 3A:
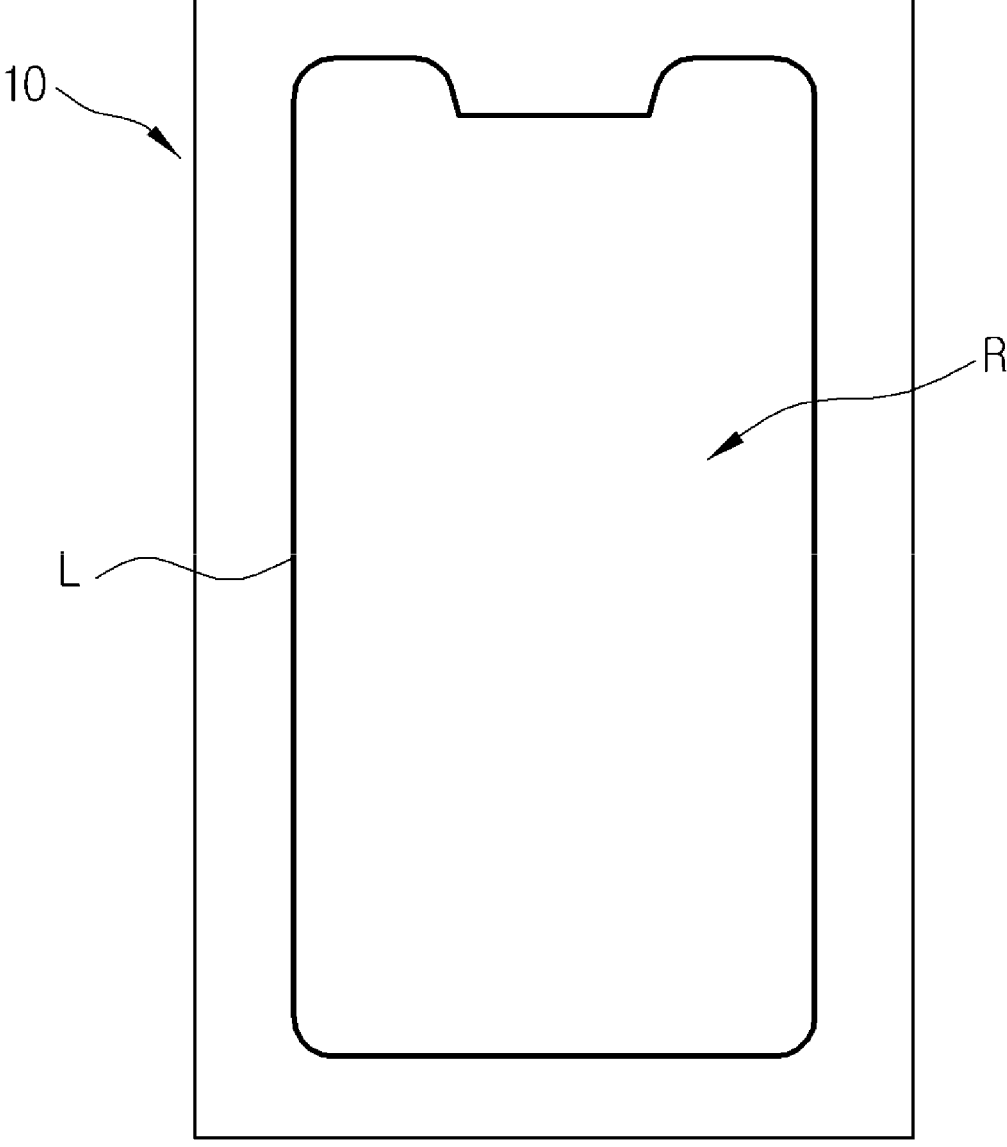
FIG. 3A is a diagram illustrating an area of interest of a sample according to the present invention.
Figure 3B:
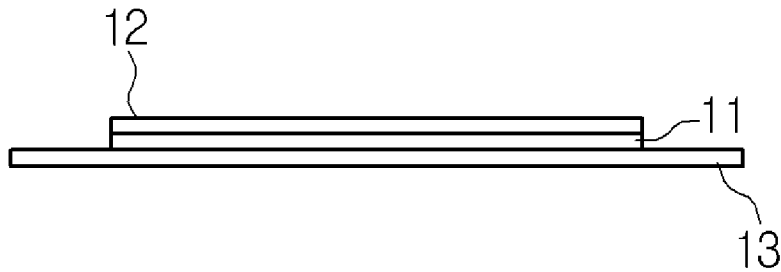
FIG. 3B is a cross-sectional view of the sample of FIG. 3A.

Referring to FIGS. 3A and 3B, the sample 10 made of multiple layers, such as an OCA film, includes a base layer 11 and an upper side protective layer 12 and a lower protective layer 13 adhered to both sides of the base layer 11, respectively, and when the lower protective layer 13 is provided with a larger area than the base layer 11, it is necessary to inspect only an area of interest where the base layer 11 requiring the detection of foreign substances exists. Accordingly, when the side light is irradiated toward the sample 10 using the side light unit 200 and the low-magnification image is captured by the low-magnification optical module 300, the base layer 11 protrudes above the lower protective layer 13 to reflect light so that a boundary line L between the base layer 11 and the lower protective layer 13 is displayed by a line of light in the low-magnification image, so that the user device 500 may cut out the low-magnification image into an area of interest R along the boundary line L indicated by a line of light and detect and confirm the foreign substances only for the area of interest R.

The low-magnification optical module 300 is installed on the upper side of the stage 100, but is installed at a higher position than the high-magnification optical module 400. For example, the low-magnification optical module 300 may be supported and installed on a frame (not shown), and the frame may have holes formed therethrough to be able to capture the image of the sample 10 mounted on the lower stage 100. The low-magnification optical module 300 includes an image sensor and captures the image of the sample 10 to detect the foreign substances in the sample 10 using the light scattering of the foreign substances by the side light irradiated from the side light unit 200, thereby generating the low-magnification image. An optical axis of the low-magnification optical module 300 is arranged based on a z-axis. When the low-magnification optical module 300 is operated and performs image capturing, the high-magnification optical module 400 waits outside a field of view of the low-magnification optical module 300, that is, on one side of the stage 100.

The low-magnification optical module 300 has a large angle of view, so an image capturing area is wide and may generate the low-magnification image for the entire area of the sample 10, and may be connected and installed with a low-magnification driving unit 310 to control the driving in the vertical direction, which is the z-axis direction, and may adjust the image capturing area according to the sample 10 mounted on the stage 100. As the low-magnification driving unit 310, a lead screw, a ball screw, a linear guide, a belt, etc., operated by a motor may be used. The image capturing area of the low-magnification optical module 300 may be 200 mm wide×150 mm long. Since the low-magnification image captured by the low-magnification optical module 300 shows light scattering that occurs when the side light irradiated from the side light unit 200 is reflected by foreign substances, it is possible to increase detection power by increasing the detection size where the image sensor of the low-magnification optical module 300 may accept, easily and quickly detect and confirm the foreign substances, and detect even the foreign substances having a smaller size than the originally detectable size by the low-magnification optical module 300. For example, as described above, by using the light scattering, it is possible to detect even small particles that are about ⅓ of the size that the low-magnification optical module 300 may originally detect. When a plurality of foreign substances exist in the sample 10, the user device 500 may determine the quality of the sample by calculating the distance between the foreign substances through the low-magnification image transmitted from the low-magnification optical module 300. For example, even if a plurality of foreign substances with a size smaller than a reference value are detected in the sample 10, when the distances between the foreign substances are close to each other, the product may be determined to be defective. However, since the foreign substances are indicated as a shining dot in the low-magnification image captured by the low-magnification optical module 300, the actual shape, color, size, etc., of the foreign substance may not be known.

The high-magnification optical module 400 is installed on one side of the stage 100, and includes the image sensor to image capture the sample 10 and generate the high-magnification image, and may be connected and installed with the high-magnification driving unit 410 to be driven in each axis direction of the x-axis, y-axis, and z-axis. For example, a plurality of high-magnification driving units 410 may be installed to be individually driven in each axis direction of the x-axis, y-axis, and z-axis. The high-magnification driving unit 410 may use various driving devices so that the high-magnification optical module 400 may be moved in each axis direction of the x-axis, y-axis, and z-axis. For example, as the high-magnification driving unit 410, the lead screw, the ball screw, the linear guide, a belt, etc., operated by the motor may be used. The above-described x-axis, y-axis, and z-axis may be each axis of a left-right direction, a front-back direction, and a vertical direction that constitute an optical module coordinate system formed based on a mounting surface space at the upper portion of the stage 100. When moving the high-magnification optical module 400 based on the x-axis or y-axis, the high-magnification driving unit 410 may move in parallel to the sample mounting surface of the stage 100 while the height of the high-magnification optical module 400 remains unchanged, and when moving the high-magnification optical module 400 based on the z-axis, the high-magnification driving unit 410 may change a focal length of the sample while the height of the high-magnification optical module 400 changes.

The high-magnification optical module 400 has a direct light unit 420 that is installed at a lower portion thereof and irradiates direct light toward the sample 10. When capturing the high-magnification image of the high-magnification optical module 400, the direct light from the direct light unit 420 may be irradiated, or side light or light from various angles may be irradiated. The optical axis of the low-magnification optical module 300 is arranged based on the z-axis. In the present invention, the magnification ratio of the low-magnification optical module 300 and the high-magnification optical module 400 is preferably 1,000:1 or more. The high-magnification optical module 400 may move in the x-axis and y-axis directions by the high-magnification driving unit 410 to confirm the shape, color, size, optical characteristic values, etc., of foreign substance in detail from the high-magnification image captured by moving from the low-magnification image to a foreign substance coordinate area where the foreign substance is detected, and may quickly determine whether the quality of the product is abnormal by confirming the layer and depth where the foreign substance exists in the sample and the height of the foreign substance. The high-magnification optical module 400 has a small angle of view, so the image capturing area is narrow, may generate the high-magnification image of a part of the sample, and may be connected with the high-magnification driving unit 410 and installed to be driven in the z-axis direction to adjust the distance from the sample. For example, the image capturing area of the high-magnification optical module 400 may be 2 mm wide×1 mm long.

The user device 500 may control the operation of the low-magnification optical module 300 and the high-magnification optical module 400, and may receive, store, play, and analyze the low-magnification image and the high-magnification images, extract optical characteristic values from the high-magnification image and compare and determine the optical characteristic values, and may be electronic devices such as computers, laptops, smartphones, tablet PCs, and PDAs that include display screens and communication modules. The user device 500 is installed with a dedicated program that may compare and analyze the low-magnification image and the high-magnification image. As the optical characteristic value, any one selected from RGB values, YUV values, HSB values, and Lab values may be used. The RGB value is a method of expressing an image by mixing red (R), green (G), and blue (B). The image is created by gathering many small squares called pixels, in which each pixel is created by a combination of red, green, and blue and each of red, green, and blue may represent 256 color levels from 0 to 255. For example, RGB (255,0,0) may be expressed by red, and RGB (255,100,0) may be expressed by red mixed with green. The YUV value is a method of expressing color using three types of information: a luminance signal Y, a color difference U between the luminance signal and a blue component, and a color difference V between the luminance signal and a red component. The RGB values and the YUV values may be converted to each other using a set formula. The HSB value is a value representing hue H, saturation S, and brightness B, and is a notation method for color information mainly used in programs such as Photoshop. The hue H has a range from 0° to 360°, and the saturation S represents the degree of darkness when a darkest state of a specific color is set to 100%. A saturation value of 0% represents an achromatic color of the same brightness. The brightness B represents the degree of brightness when white is 100% and black is 0%. The Lab value is a color system re-established by the international standard color measurement organization called Commission International d'Eclairage (CIE). Even if the color is the same, there may be a slight to serious difference between a color seen on one's monitor and a color seen on another monitor. The Lab value is a color model developed to compensate for these differences. It is generally written as L*a*b*. Here, component L refers to luminosity, which is brightness, component a refers to the relationship between green and red, and when component a goes toward a negative number, it becomes green, and when component a goes toward a positive number, it becomes red, and component b refers to the relationship between blue and yellow, and when component b goes toward a negative number, it becomes blue and when component b goes toward a positive number, it becomes yellow.

When using the optical characteristic values as the RGB values, a layer detectable maximum index $LDI_{max}$ may be calculated and used.

$$LDI_{max} = R_{max} \times G_{max} \times B_{max}$$

$R_{max}$: Maximum value among R component values of pixels within a high-magnification image capturing area $G_{max}$: Maximum value among G component values of pixels within the high-magnification image capturing area $B_{max}$: Maximum value among B component values of pixels within the high-magnification image capturing area That is, there are a plurality of pixels within the high-magnification image capturing area. For example, horizontal and vertical pixel values within the high-magnification image capturing area are 500×500 pixels, and the optical characteristic values are extracted for each pixel and among them, the $LDI_{max}$ is derived by finding and multiplying $R_{max}$, $G_{max}$, and $B_{max}$.

In general, light irradiated from a light source toward the sample 10 is reflected or scattered by foreign substances, and some foreign substances, such as carbon black, have a property of absorbing light. In this case, since the optical characteristic values of the foreign substances are relatively low in the high-magnification image of the sample captured by the high-magnification optical module 400, when using the optical characteristic values in RGB, a layer detectable minimum index $LDI_{min}$ may be calculated and used.

$$LDI_{min} = R_{min} \times G_{min} \times B_{min}$$

$R_{min}$: Minimum value among R component values of pixels within a high-magnification image capturing area $G_{min}$: Minimum value among G component values of pixels within the high-magnification image capturing area $B_{min}$: Minimum value among B component values of pixels within the high-magnification image capturing area That is, there are a plurality of pixels within the high-magnification image capturing area. For example, the horizontal and vertical pixel values within the high-magnification image capturing area are 500×500 pixels, and the optical characteristic values are extracted for each pixel and among them, the $LDI_{min}$ is derived by finding and multiplying $R_{min}$, $G_{min}$, and $B_{min}$.

In this way, by using the $LDI_{max}$ or $LDI_{min}$ converted into a significantly large or small number calculated by multiplying the respective maximum or minimum values of the R component, G component, and B component, there is a large difference in the optical characteristic values between the area where the foreign substance exists and the area where the foreign substances do not exist, so it is possible to increase the detection accuracy of the layer and depth where the foreign substances exist and the height of the foreign substance, etc., and even if errors in RGB values occur in some of the pixels within the high-magnification image area, or defective pixels or noise occur in some of the image sensors, it is possible to identify the layer and depth where the foreign substance exists and the height of the foreign substance without error. The above is described by applying only the RGB values when deriving the $LDI_{max}$ and $LDI_{min}$, but the YUV values, the HSB values, and the Lab values may be applied to the present invention by multiplying the maximum and minimum values among the respective component values that constitute the optical characteristic values extracted for each pixel within the high-magnification image capturing area.

The user device 500 may include a reference value storage unit 510, an area of interest extraction unit 520, a foreign substance detection unit 530, a coordinate determination unit 540, an optical module control unit 550, an optical characteristic value extraction unit 560, a reference surface determination unit 570, a foreign substance analysis unit 580, and a determination unit 590.

The reference value storage unit 510 stores a reference value range of an upper end surface of the sample for the optical characteristic values extracted from the high-magnification image obtained by capturing, by the high-magnification optical module 400, the upper end surface of the sample in advance and a foreign substance reference value range for the optical characteristic values extracted from the high-magnification image obtained by capturing, by the high-magnification optical module 400, the area where the foreign substance exists after including the foreign substance in the sample 10 in advance. More specifically, after mounting the sample 10 having no foreign substances on the stage 100, the optical characteristic values of the upper end surface of the sample 10 are extracted when the high-magnification optical module 400 focuses on the upper end surface of the sample while manually moving in the vertical direction on the sample 10. To increase accuracy, the optical characteristic values are extracted repeatedly for a plurality of points on the upper end surface of the sample. In this case, the horizontal and vertical pixel values of the high-magnification image captured by the high-magnification optical module 400 are predetermined. For example, the horizontal and vertical pixel values of the high-magnification image may be 500×500 pixels, the optical characteristic values may be extracted for each pixel, and the $LDI_{max}$ or $LDI_{min}$ may be obtained to be determined to be the reference value for the upper end surface of the sample. In addition, when the process is repeatedly performed on a plurality of points on the upper end surface of the sample, the optical characteristic values for each image capturing area of the upper end surface of the sample are derived, and the reference value range of the upper end surface of the sample is determined. For example, the reference value range of the upper end surface of the sample may be stored in the reference value storage unit 510 as the range of the $LDI_{max}$ or $LDI_{min}$.

After a specific foreign substance having a certain size is artificially included in the sample 10 and the sample 10 containing the foreign substances is mounted on the stage 100, the high-magnification optical module 400 extracts the optical characteristic values of the foreign substances when focusing on the foreign substances while manually moving in the vertical direction above the foreign substance coordinate area. In this case, the horizontal and vertical pixel values of the high-magnification image captured by the high-magnification optical module 400 are predetermined. For example, the horizontal and vertical pixel values of the high-magnification image may be 500×500 pixels, the optical characteristic values may be extracted for each pixel, and the $LDI_{max}$ or $LDI_{min}$ may be obtained to be determined to be the foreign substance reference value. In addition, when the operation of extracting the optical characteristic values by including the foreign substances at various depths in the sample 10 is repeatedly performed, the optical characteristic values for the foreign substance coordinate area are derived and the foreign substance reference value range is determined. For example, the foreign substance reference value range may be stored in the reference value storage unit 510 as the range of the $LDI_{max}$ or $LDI_{min}$.

The area of interest extraction unit 520 cuts out a boundary line L indicated by the line of light by side light from the low-magnification image captured by the low-magnification optical module 300 and extracts the cut out boundary line L as the area of interest R. Recently, the multi-layer film for display products such as smartphones are expanding the detection area to the edge of the film due to the reduction of the bezel of the product. Accordingly, when the side light is irradiated toward the sample 10 using the side light unit 200 and the low-magnification image is captured by the low-magnification optical module 300, the base layer 11 and the boundary line L of the lower protective layer 13 are indicated by the line of light in the low-magnification image, so the area of interest extraction unit 520 may cut out the area of interest R along the boundary line L indicated by the line of light in the low-magnification image, and detect and confirm the foreign substances only for the area of interest R.

The foreign substance detection unit 530 uses light scattering of foreign substances by the side light irradiated from the side light unit 200 from the low-magnification image of the sample 10 captured and transmitted by the low-magnification optical module 300 to detect the foreign substances. In this case, the foreign substance detection unit 530 may detect the foreign substances for the area of interest R. The coordinate determination unit 540 derives the foreign substance coordinate area where the foreign substances are detected in the low-magnification image, matches the image capturing area of the high-magnification optical module 400 with the foreign substance coordinate area, and determines an adjacent coordinate area having no foreign substances adjacent to the foreign substance coordinate area. For example, the coordinate determination unit 540 derives the foreign substance coordinate area on the stage 100 in the wide-area low-magnification image, and then matches the narrow image capturing area of the high-magnification optical module 400 with the foreign substance coordinate area, and when an adjacent coordinate area having no foreign substances is determined among the areas adjacent to the foreign substance coordinate area, the optical module control unit 550 transmits a control signal to the high-magnification driving unit 410 to move the high-magnification optical module 400 to the adjacent coordinate area.

The optical module control unit 550 controls the operation of the low-magnification optical module 300 and the high-magnification optical module 400, transmits the control signal to the low-magnification driving unit 310 to control the low-magnification optical module 300 to move in the vertical direction or transmits the control signal to the high-magnification driving unit 410 to control the high-magnification optical module 400 in the x-axis and y-axis directions so that the high-magnification optical module 400 moves to a foreign substance coordinate area or an adjacent coordinate area having no foreign substances adjacent to the foreign substance coordinate area, and controls the low-magnification optical module 300 and the high-magnification optical module 400 to capture an image. The optical module control unit 550 controls the high-magnification driving unit 410 in the adjacent coordinate area so that the high-magnification optical module 400 continuously captures the high-magnification image while moving in the z-axis direction by a certain number, for example, 0.1 μm, and when a reference surface S is determined by the reference surface determination unit 570, controls the high-magnification driving unit 410 so that the high-magnification optical module 400 moves horizontally from the adjacent coordinate area to the foreign substance coordinate area along the reference surface S and then controls the high-magnification driving unit 410 in the foreign substance coordinate area to continuously capture the high-magnification image while the high-magnification optical module 400 descends in the z-axis direction by a certain number, for example, 0.1 μm, from the reference surface S.

The optical characteristic value extraction unit 560 extracts the optical characteristic values from the high-magnification image captured and received by the high-magnification optical module 400. In this case, the optical characteristic value extraction unit 560 can calculate and use the $LDI_{max}$ or $LDI_{min}$ from the extracted optical characteristic values.

Figure 4A:
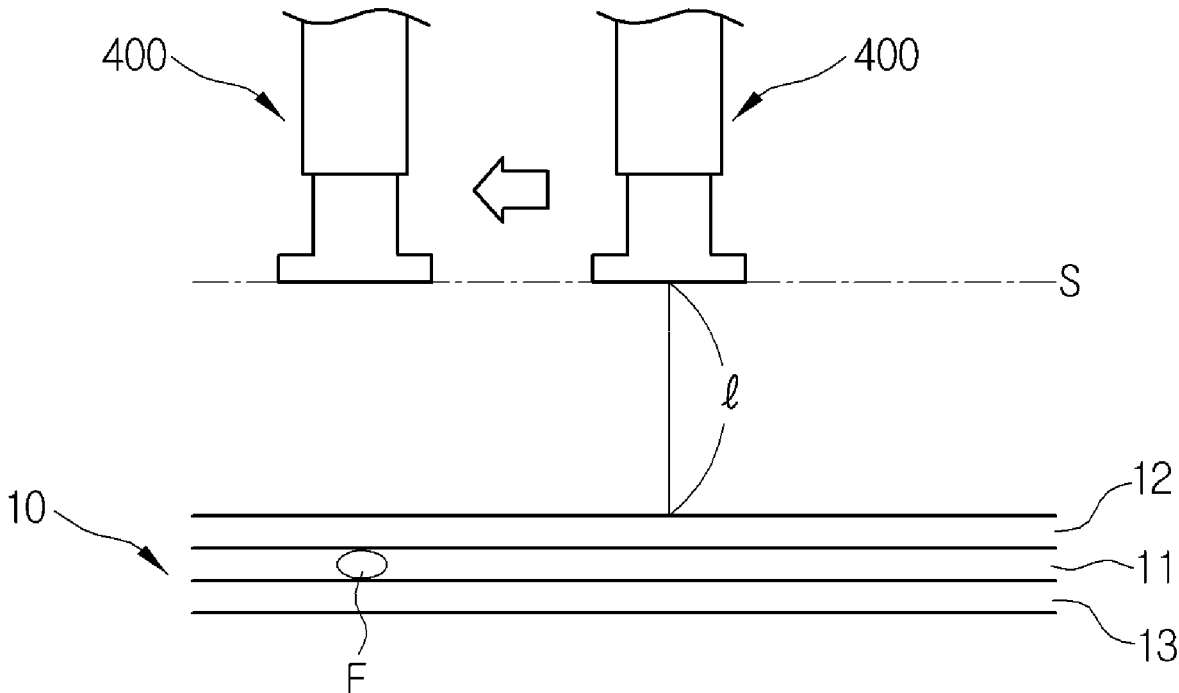
FIG. 4A is a diagram illustrating a process in which a high-magnification optical module moves to a foreign substance coordinate area after determining a reference surface in an adjacent coordinate area according to the present invention.

The reference surface determination unit 570 compares the optical characteristic values extracted by the optical characteristic value extraction unit 560 from the high-magnification image continuously captured and transmitted by the high-magnification optical module 400 in the adjacent coordinate area having no foreign substances adjacent to the foreign substance coordinate area with the reference value range of the upper end surface of the sample stored in the reference value storage unit 510 in real time to determine the position of the high-magnification optical module 400 as the reference surface S when capturing the high-magnification image from which the optical characteristic values included in the reference value range of the upper end surface of the sample are extracted. For example, the height of the lower end portion of the high-magnification optical module 400 when the $LDI_{max}$ or $LDI_{min}$ extracted and calculated from the high-magnification image by the optical characteristics value extraction unit 560 is included in the reference value range of the upper end surface of the sample is determined to be the reference surface S. Referring to FIG. 4A, the reference surface S is the position where the high-magnification optical module 400 focuses on the upper end surface of the sample, and the distance between the reference surface S and the upper end surface of the sample is defined as a reference distance C. Since the high-magnification optical module 400 may not automatically focus on the upper end surface of the sample, the reference value range of the upper end surface of the sample for the optical characteristic values of the upper end surface of the sample is extracted and stored in advance, and when testing the sample 10, the optical characteristic values extracted from the high-magnification image captured in the adjacent coordinate area when determining the reference surface S are compared with the reference value range of the upper end surface of the sample to determine the reference surface S.

Figure 4B:
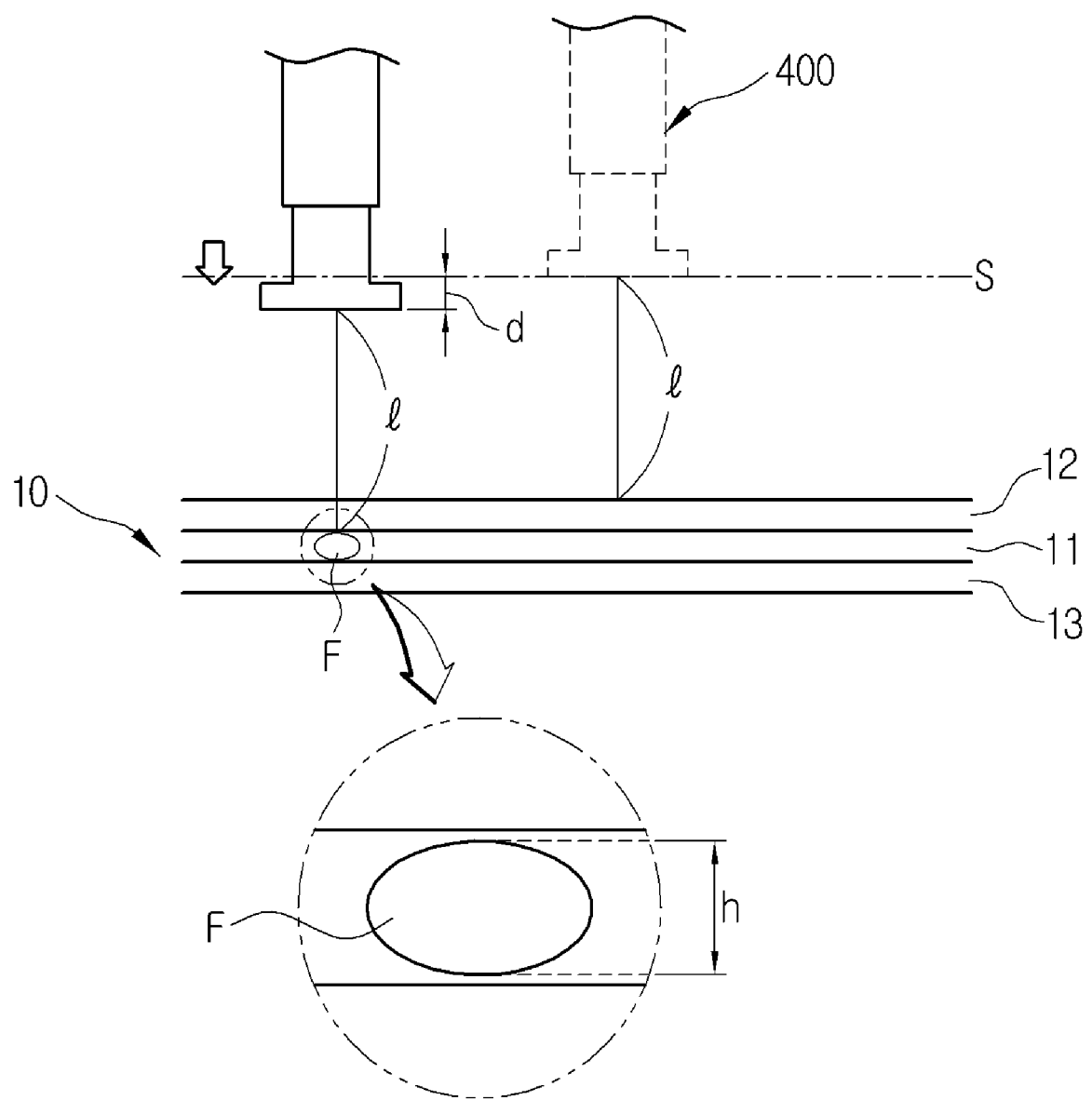
FIG. 4B is a diagram illustrating a process of determining a depth where the foreign substance exists while the high-magnification optical module descends in the foreign substance coordinate area and a height of the foreign substance.

After determining the reference surface S in the reference surface determination unit 570, as illustrated in FIG. 4B, the optical module control unit 550 controls the high-magnification driving unit 410 to horizontally move the high-magnification optical module 400 from the adjacent coordinate area to the foreign substance coordinate area along the reference surface S, and then the foreign substance analysis unit 580 compares the optical characteristic values extracted by the optical characteristic value extraction unit 560 from the continuously captured and transmitted high-magnification image while the high-magnification optical module 400 descends in the z-axis direction by a certain number, for example, 0.1 μm, in the foreign substance coordinate area containing a foreign substance F and maintains a focal length over the entire thickness of the sample 10 with the foreign substance reference value range stored in the reference value storage unit 510 in real time. When calculating the vertical distance descending from the reference surface S of the high-magnification optical module 400 at the time of capturing the high-magnification image from which the optical characteristic values included in the foreign substance reference value range are extracted, it is the same as the depth at which the foreign substances exist from the upper end surface of the sample, so it is possible to confirm the depth d where the foreign substance exists within the sample. For example, the vertical distance descending from the reference surface S of the high-magnification optical module 400 when the $LDI_{max}$ or $LDI_{min}$ extracted and calculated from the high-magnification image by the optical characteristic value extraction unit 560 is included in the foreign substance reference value range may be calculated to confirm the depth d where the foreign substances exist. In this case, it is preferable that the optical module control unit 550 controls the high-magnification driving unit 410 to perform image capturing over the entire thickness of the sample 10 while the high-magnification optical module 400 descends.

The foreign substance F included in the sample 10 has a height, and when the optical characteristic values are extracted from a plurality of high-magnification images captured in the range corresponding to the height h of the foreign substance, may be all included in the foreign substance reference value range. Therefore, the foreign substance analysis unit 580 may determine the height h of the foreign substance F by calculating the vertical distance between a starting position of the high-magnification optical module 400 where the optical characteristic value extracted from the continuously captured high-magnification image while the high-magnification optical module 400 descends in the foreign substance coordinate area begins to fall within the foreign substance reference value range and an ending position of the high-magnification optical module 400 where the optical characteristic value extracted from the continuously captured high-magnification image while the high-magnification optical module 400 descends in the foreign substance coordinate area falls last within the foreign substance reference value range. Through this, it is possible to confirm to what depth the foreign substance F exists within the sample 10. For example, when the starting position is 4 μm from the reference surface S and the ending position is 9 μm from the reference surface S, the height h of the foreign substance F may be determined to be 5 μm.

Figure 5A:
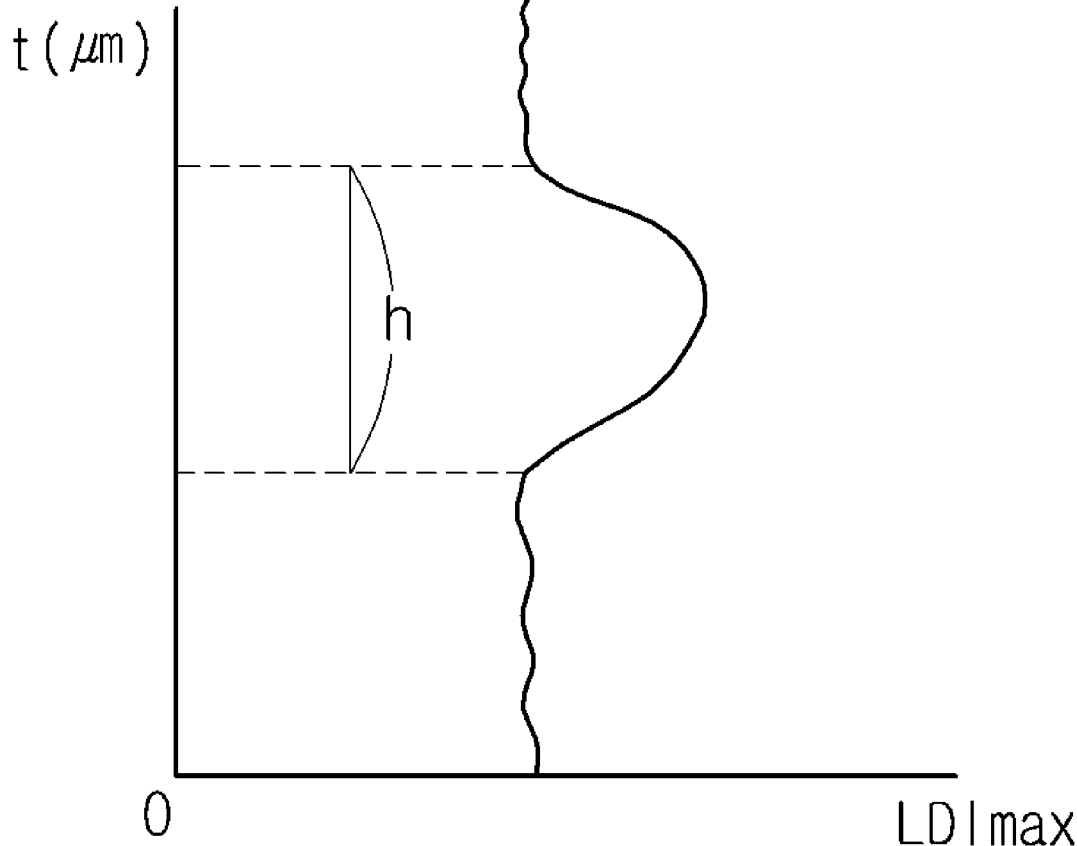
FIG. 5A is a graph schematically illustrating a distribution of a layer detectable maximum index $LDI_{max}$ according to a depth t from an upper end surface of the sample containing foreign substances having light reflecting property in the present invention.
Figure 5B:
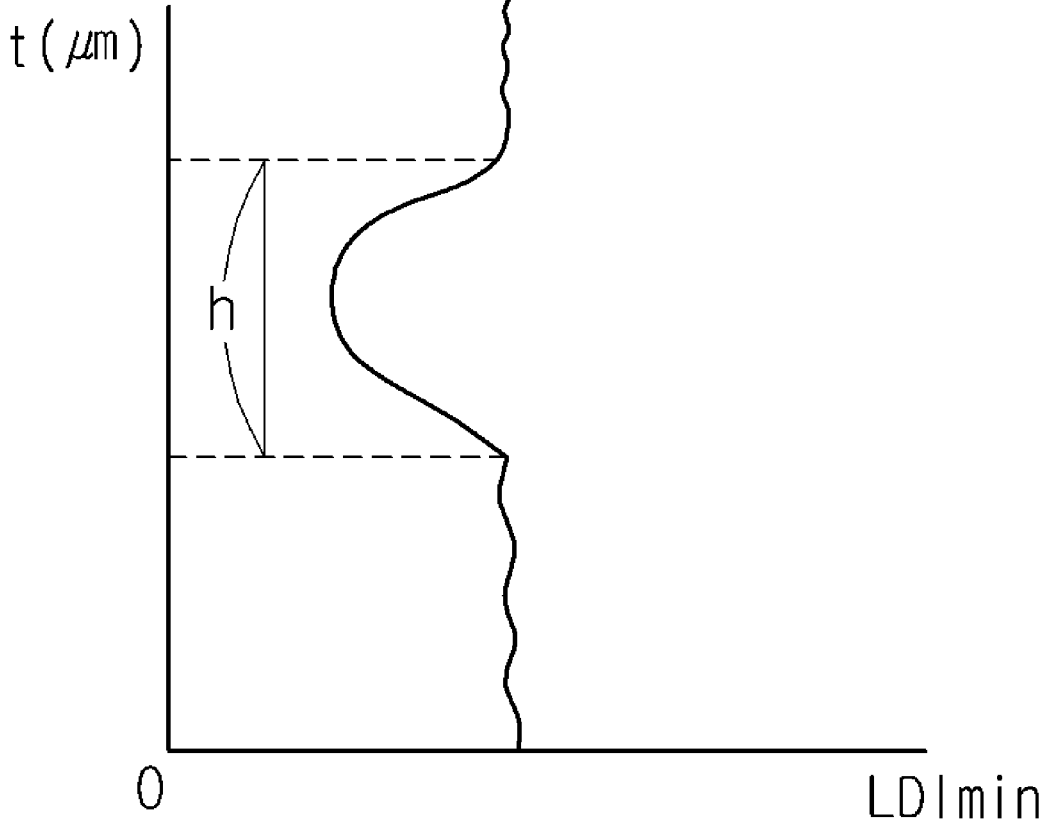
FIG. 5B is a graph schematically illustrating a distribution of a layer detectable minimum index $LDI_{min}$ according to the depth t from the upper end surface of the sample containing foreign substances having a light absorbing property in the present invention.

The distribution of the $LDI_{max}$ extracted and calculated from the plurality of high-magnification images captured for the range corresponding to the height h of the foreign substance F may be shown as in FIG. 5A, and the distribution of the $LDI_{min}$ may be shown as in FIG. 5B. FIG. 5A is a graph schematically illustrating a distribution of $LDI_{max}$ according to a depth t from an upper end surface of the sample 10 containing foreign substances having light reflecting property in the present invention, and FIG. 5B is a graph schematically illustrating a distribution of the $LDI_{min}$ according to the depth t from the upper end surface of the sample 10 containing foreign substances having a light absorbing property. Referring to FIG. 5A, it can be confirmed that, in the case of the foreign substance that has the light reflecting property, the $LDI_{max}$ is maximized in a central portion of the foreign substance, and referring to FIG. 5B, in the case of the foreign substance that has the light absorbing property, the optical characteristic value LDI min is minimized in the central portion of the foreign substance.

Figure 6:
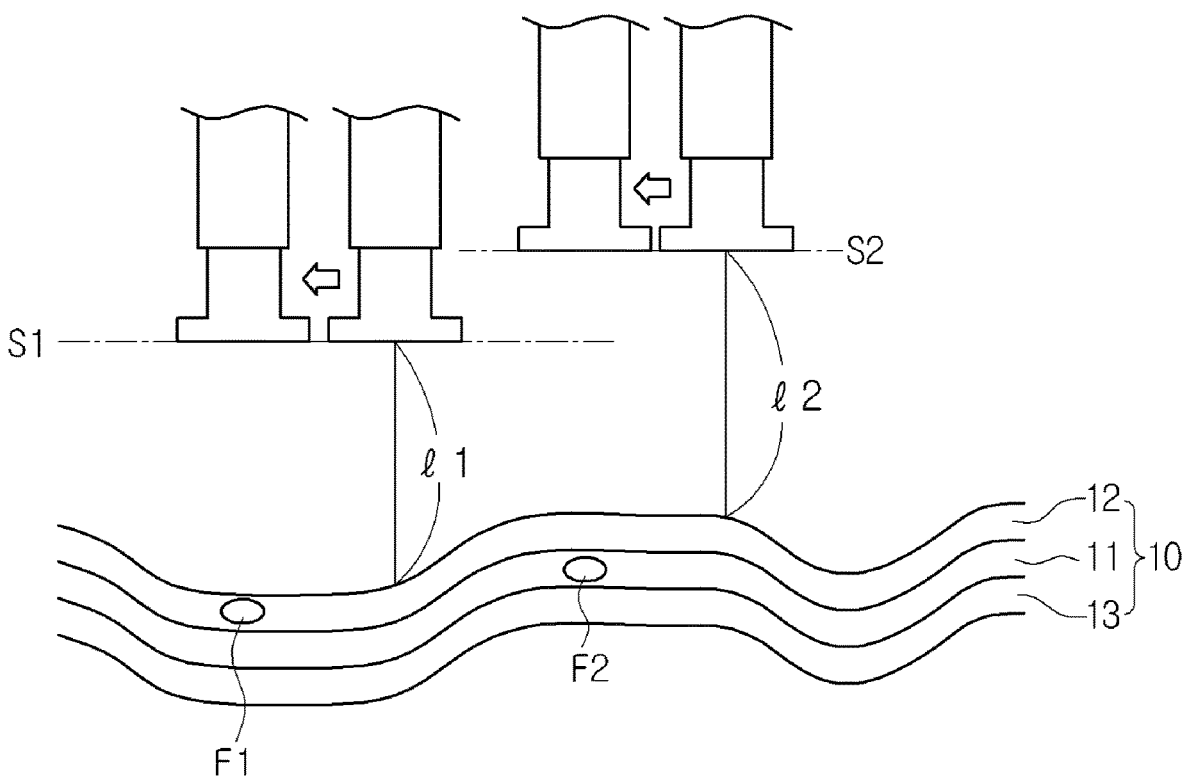
FIG. 6 is a diagram illustrating a process of determining reference surfaces for each foreign substance when the sample is curved and bent in the present invention.

Meanwhile, when the plurality of foreign substances exist in the sample 10 and the sample 10 mounted on the stage 100 is not bent and is flat, after only one reference surface S is determined, the high-magnification optical module 400 continuously captures the high-magnification images for each foreign substance coordinate area based on the reference surface S and repeatedly perform analysis on the depth d where each foreign substance exists, and the height h of each foreign substance, etc., but when the sample 10 mounted on the stage 100 is curved and bent, should determine the reference surface S separately for each foreign substance and apply the determined reference surface S to each foreign substance analysis. For example, referring to FIG. 6, in the bent sample 10, for the foreign substance F1, the height of the high-magnification optical module 400, which has the upper end surface of the sample and the focal distance l1, becomes the reference surface S1, and for the foreign substance F2, the height of the high-magnification optical module 400, which has the upper end surface of the sample and the focal length l2, becomes the reference surface S2, and when determining the depth where the foreign substance exists for the foreign substance F1, the foreign substance analysis unit 580 calculates the vertical distance descending from the reference surface S1, and when determining the depth where the foreign substance exists for foreign substance F2, calculates the vertical distance descending from the reference surface S2.

The determination unit 590 may determine whether the sample 10 is a normal product or a defective product according to at which layer or position the depth d where the foreign substances exist is located. In the sample 10 such as an OCA film, when the foreign substances exist in the upper side protective layer 12 and the lower protective layer 13, the sample 10 is determined to be a normal product that can be used, and when the foreign substances exist in the base layer 11, it is judged as a defective product that cannot be used. In addition, the determination unit 590 may make the determination by considering the height h of the foreign substance analyzed by the foreign substance analysis unit 580.

For example, the total thickness of the sample 10 made of OCA film is 40 μm, in which when the base layer 11 has a thickness of 20 μm including adhesive surfaces on both sides, and the upper side protective layer 12 and the lower side protective layer each are 10 μm, if the depth d where the foreign substance exists is 4 μm from the upper end surface of the sample, the foreign substance exists in the upper side protective layer 12, so the sample 10 may first be determined to be a normal product, but errors may occur in the determination when the height of the foreign substance is not considered. Therefore, when the height h of the foreign substance is 3 μm, the foreign substance does not affect the base layer 11, and therefore, the sample 10 is determined to be a normal product. When the height h of the foreign substance is 6 μm or more, since the foreign substance is in contact with the base layer 11 and is likely to be conducted to the base layer 11 or exists over the upper side protective layer 12 and the base layer 11, it is determined to be a defective product.

The foreign substance analysis unit 580 may measure the distance between the foreign substances detected in the low-magnification image, and the determination unit 590 may consider the size of the detected foreign substance and the perspective of the distance between the foreign substances for the determination. For example, when the plurality of foreign substances are detected in the low-magnification image captured by the low-magnification optical module 300, the foreign substance analysis unit 580 may calculate the depth d where the foreign substance exists and the height h of the foreign substance, compare the detected size of the foreign substance with the reference value, and measure the detected distance between the foreign substances. Accordingly, in the sample 10 made of the multi-layer film, when the foreign substance exists in the base layer 11 and the size of the foreign substance is equal to or less than the reference value and the distance between foreign substances is farther than the reference distance, the foreign substance may adversely affect the quality, and therefore, the sample 10 may be determined to be a normal product, and when the foreign substance exists in the base layer 11 and the size of the foreign substance is equal to or less than the reference value, but the distance between the foreign substances is closer than the reference distance, the foreign substance may have a negative impact on quality and therefore, the sample 10 may be determined to be a defective product.

The foreign substance type analyzer may be connected and installed with the high-magnification optical module 400 to analyze the kind of foreign substances contained in the sample 10. For example, by connecting and installing a Raman spectrophotometer, Fourier transform infrared spectroscopy (FT-IR), or the like to the high-magnification optical module 400, the kind of foreign substances may be analyzed. The foreign substance analysis by the foreign substance type analyzer is the already known technology, and therefore, detailed description thereof will be omitted.

Hereinafter, the operation of the high-speed automatic film-foreign substance detection apparatus of the present invention will be briefly described through one embodiment with reference to FIGS. 7A and 7B.

The sample 10 uses an OCA film and has a total thickness of 40 μm, in which the base layer 11 has a thickness of 20 μm including the adhesive surfaces on both sides, and the upper side protective layer 12 and the lower protective layer 13 each are 10 μm. The optical characteristic value is used by calculating the $LDI_{max}$ or $LDI_{min}$ from the RGB values. As described above, the reference value range of the upper end surface of the sample and the foreign substance reference value range derived in advance for the OCA film through testing are stored in the reference value storage unit 510, and in this case, these values are calculated and stored as the $LDI_{max}$ or $LDI_{min}$.

For example, among the RGB values extracted for each pixel in the high-magnification image captured by manually focusing with the high-magnification optical module 400 for the upper end surface of the sample having no foreign substances of the OCA film, $R_{max}=190$, $G_{max}=190$, and $B_{max}=100$ are extracted, resulting in $LDI_{max}=3,610,000$. By repeatedly performing the procedure for multiple points of the upper end surface of the sample, the reference value range of the upper end surface of the sample of $3,500,658 \leq LDI_{max} \leq 3,721,062$ is derived.

In addition, after a foreign substance with a size of 5 μm and a light reflecting property is artificially included between the base layer 11 and the upper side protective layer 12 of the OCA film, among the RGB values extracted for each pixel in the high-magnification image captured by manually focusing with the high-magnification optical module 400 for the foreign substance coordinate area, $R_{max}=250$, $G_{max}=250$, and $B_{max}=150$ are extracted, resulting in $LDI_{max}=9,375,000$. In addition, by repeatedly performing the procedure by including the foreign substance in various positions of the OCA film, the foreign substance reference value range of $9,102,592 \leq LDI_{max}$ is derived.

In addition, after a foreign substance with a size of 5 μm and a light absorbing property is artificially included between the base layer 11 and the upper side protective layer 12 of the OCA film, among the RGB values extracted for each pixel in the high-magnification image captured by manually focusing with the high-magnification optical module 400 for the foreign substance coordinate area, $R_{min}=125$, $G_{min}=125$, $B_{min}=60$ are extracted, resulting in $LDI_{min}=937,500$. In addition, by repeatedly performing the procedure by including the foreign substance in various positions of the OCA film, the foreign substance reference value range of $LDI_{min} \leq 992,124$ is derived.

First, the sample 10 of the OCA film is mounted on the stage 100, the illumination of the plurality of side light units 200 is turned on, and the low-magnification optical module 300 captures the low-magnification image of the sample 10 with a wide image capturing area of 200 mm wide×150 mm long, and transmits the captured low-magnification image to the user device 500. The optical module control unit 550 may transmit a signal to the low-magnification driving unit 310, and control the low-magnification optical module 300 to be driven in the vertical direction to adjust the image capturing area according to the sample 10. In this case, the high-magnification optical module 400 waits outside the field of view of the low-magnification optical module 300. The area of interest extraction unit 520 cuts out and extracts the area of interest R along the boundary line L indicated by the line of light reflected by the side light irradiated from the side light unit 200 in the low-magnification image. The foreign substance detection unit 530 detects the foreign substance using the light scattering of the foreign substance by the side light irradiated from the side light unit 200 within the area of interest R of the low-magnification image.

The coordinate determination unit 540 derives the foreign substance coordinate area where the foreign substances are detected in the area of interest R, matches the image capturing area of the high-magnification optical module 400 with the foreign substance coordinate area, and finds and determines the adjacent coordinate area having no foreign substances among the area of the sample 10 adjacent to the foreign substance coordinate area.

The optical module control unit 550 transmits a signal to the high-magnification driving unit 410, and controls the high-magnification optical module 400 to be driven in the x-axis and y-axis directions so that the high-magnification optical module 400, which was waiting outside the field of view of the low-magnification optical module 300, moves to the adjacent coordinate area, and then turn on the direct light unit 420, and control the high-magnification optical module 400 to continuously capture the high-magnification image while moving in the z-axis direction by 0.1 μm in the adjacent coordinate area, and transmit the captured high-magnification images to the user device 500.

The optical characteristic value extraction unit 560 extracts RGB values from the high-magnification images and calculates the $LDI_{max}$, and the reference surface determination unit 570 determines the height where the high-magnification optical module 400 is located when the $LDI_{max}$ derived from the high-magnification images is included in the reference value range of the upper end surface of the sample $(3,500,658 \leq LDI_{max} \leq 3,721,062)$ as the reference surface S. Next, the optical module control unit 550 controls the high-magnification driving unit 410 so that the high-magnification optical module 400 moves horizontally from the adjacent coordinate area to the foreign substance coordinate area along the reference surface S.

Then, the optical module control unit 550 transmits a signal to the high-magnification driving unit 410 to control the high-magnification optical module 400 to turn on the direct light unit 420, continuously capture the high-magnification image over the entire thickness of the sample 10 while high-magnification optical module 400 descends in the z-axis direction by 0.1 μm in the foreign substance coordinate area, and transmit the captured high-magnification images to the user device 500.

The optical characteristic value extraction unit 560 extracts the RGB values from the high-magnification images and calculates the $LDI_{max}$, and the foreign substance analysis unit 580 calculates the vertical distance descending from the reference surface S of the high-magnification optical module 400 when the $LDI_{max}$ derived from the high-magnification images is included in the foreign substance reference value range ($9,102,592 \leq LDI_{max}$) to derive the depth d where the foreign substance exists. For example, when the $LDI_{max}$ is derived as 9,114,147 from any high-magnification image, if the vertical distance where the high-magnification optical module 400 descends from the reference surface S at that time is 4 μm, the depth d where the foreign substance exists may be determined to be 4 μm from the upper end surface of the sample. In this case, since the foreign substance exists in the upper side protective layer 12, the determination unit 590 may determine that the sample 10 is a normal product that can be used.

However, when the $LDI_{max}$ derived from the high-magnification images is analyzed to be included in the foreign substance reference value range ($9,102,592 \leq LDI_{max}$) multiple times, the foreign substance analysis unit 580 may determine the height h of the foreign substance by calculating the vertical distance between the starting position of the high-magnification optical module 400 that begins to fall within the foreign substance reference value range and the ending position of the high-magnification optical module 400 that last falls within the foreign substance reference value range. For example, when the vertical distance where the high-magnification optical module 400 descends from the reference surface S is 4 μm, the $LDI_{max}$ derived from the high-magnification image is first included in the foreign substance reference value range. Thereafter, the $LDI_{max}$, derived from the continuously captured high-magnification images while the high-magnification optical module 400 continues to descend, continues to be included in the foreign substance reference value range, and then, when the vertical distance where the high-magnification optical module 400 descends from the reference surface S is 10 μm, if the $LDI_{max}$ derived from the high-magnification image is last included in the foreign substance reference value range, the foreign substance height h results in 10 μm–4 μm=6 μm. In this case, the foreign substance exists in the upper side protective layer 12, but is in contact with the base layer 11, so if removing the upper side protective layer 12 when using the sample 10, there is a possibility that the foreign substances are transferred to the base layer 11, and therefore, it is determined to be defective.

In addition, in the case of the sample 10 containing the foreign substance having the light absorbing property, such as carbon black, this may not be confirmed in advance, so the present invention first applies the optical characteristic value as the $LDI_{max}$ as described above and then when the optical characteristic value is not included in the foreign substance reference value range for the pre-stored $LDI_{max}$ and thus is applied as the $LDI_{min}$ in the following order, the optical characteristic value is included in the foreign substance reference value range for the $LDI_{min}$, making the analysis of the foreign substance possible. For example, when the $LDI_{min}$ is derived as 915,120 from a high-magnification image, the $LDI_{min}$ falls within the foreign substance reference value range ($LDI_{min} \leq 992,124$), and when the vertical distance where the high-magnification optical module 400 descends from the reference surface S at that time is 35 μm, the depth d where the foreign substance exists may be determined to be 35 μm from the upper end surface of the sample. In this case, since the foreign substance exists in the lower protective layer 13, the determination unit 590 may determine that the sample 10 is a normal product that can be used.

INDUSTRIAL APPLICABILITY

A high-speed automatic film-foreign substance detection apparatus according to the present invention can detect the foreign substances included in a sample using a light scattering image captured by a low-magnification optical module, confirm the shape, color, size and optical characteristic values of the foreign substances by moving a high-magnification optical module to a foreign substance coordinate area of the sample, quickly determine whether a product can be used by confirming a layer and depth where the foreign substance exists in the sample, and a height of the foreign substance without damaging the sample, and identify a kind of foreign substances by connecting a foreign substance analyzer, and therefore has industrial applicability.

The invention claimed is:

1. A high-speed automatic film-foreign substance detection apparatus, comprising:
   a stage on which a sample is mounted;
   a plurality of side light units arranged on an upper side surface of the stage to irradiate side light toward the sample;
   a low-magnification optical module installed at an upper side of the stage and generating a low-magnification image by capturing the sample so that a foreign substance is detected from the sample using light scattering of the foreign substance by the side light irradiated from the plurality of side light units;
   a high-magnification optical module installed at one side of the stage, having a high-magnification driving unit installed and connected thereto to drive in directions of an x-axis, a y-axis and a z-axis, and generating a high-magnification image by capturing the sample; and
   a user device for controlling the operation of the low-magnification optical module and the high-magnification optical module, and receiving, storing, playing and analyzing the low-magnification image and the high-magnification image,
   wherein the user device derives a foreign substance coordinate area where the foreign substance is detected in the low-magnification image, controls the high-magnification optical module to move to an adjacent coordinate area having no foreign substance adjacent to the foreign substance coordinate area so that the high-magnification optical module continuously captures the high-magnification image while moving in the z-axis direction by a certain number in the adjacent coordinate area, compares an optical characteristic value extracted from the captured high-magnification image with a reference value range of an upper end surface of the sample, determines a height of the high-magnification optical module as a reference surface when the optical characteristic value corresponds to the reference value range of the upper end surface of the sample, allows the high-magnification optical module to move horizontally from the adjacent coordinate area to the foreign substance coordinate area along the reference surface, and then allows the high-magnification optical module to continuously capture the high-magnification image while descending in the z-axis direction by a certain number from the reference surface in the foreign substance coordinate area, compares the optical characteristic value extracted from the captured high-magnification image with a foreign substance reference value range, and determines the distance that the high-magnification optical module descends from the reference surface when the optical characteristic value corresponds to the foreign substance reference value range as a depth of the foreign substance.

2. The high-speed automatic film-foreign substance detection apparatus of claim 1, wherein each of the plurality of side light units has a light irradiation angle of 5° to 45° with respect to the sample.

3. The high-speed automatic film-foreign substance detection apparatus of claim 1, wherein the low-magnification optical module is installed to be connected to a low-magnification drive unit, and controlled to be driven in a vertical direction, and the high-magnification optical module is provided with a direct light unit that is installed at a lower portion and irradiates direct light toward the sample.

4. The high-speed automatic film-foreign substance detection apparatus of claim 1, wherein the user device comprises:

a reference value storage unit that stores the reference value range of the upper end surface of the sample for the optical characteristic value extracted from the high-magnification image obtained by capturing, by the high-magnification optical module, the upper end surface of the sample in advance and the foreign substance reference value range for the optical characteristic value extracted from the high-magnification image obtained by capturing, by the high-magnification optical module, the area where the foreign substance exists after including the foreign substance in the sample in advance;

a foreign substance detection unit that detects the foreign substance using the light scattering of the foreign substance by the side light irradiated from the plurality of side light units from the low-magnification image obtained by capturing the sample by the low-magnification optical module;

a coordinate determination unit that derives the foreign substance coordinate area where the foreign substance is detected in the low-magnification image, matches the image capturing area of the high-magnification optical module with the foreign substance coordinate area, and determines the adjacent coordinate area having no foreign substance adjacent to the foreign substance coordinate area;

an optical module control unit that controls the low-magnification optical module and the high-magnification optical module to capture an image, transmits a control signal to the high-magnification driving unit to control the high-magnification optical module in x-axis and y-axis directions to move the high-magnification optical module to the foreign substance coordinate area or the adjacent coordinate area having no foreign substance adjacent to the foreign substance coordinate area, controls the high-magnification driving unit in the adjacent coordinate area so that the high-magnification optical module continuously captures the high-magnification image while moving in a z-axis direction by a certain number, and when a reference surface is determined, controls the high-magnification driving unit to horizontally move the high-magnification optical module from the adjacent coordinate area to the foreign substance coordinate area along the reference surface, and then controls the high-magnification driving unit in the foreign substance coordinate area so that the high-magnification optical module continuously captures the high-magnification image while descending in the z-axis direction from the reference surface by a certain number;

an optical characteristic value extraction unit that extracts the optical characteristic value from the high-magnification image captured and received by the high-magnification optical module;

a reference surface determination unit that compares the optical characteristic value extracted from the high-magnification image continuously captured in the adjacent coordinate area with the reference value range of the upper end surface of the sample and determines a position of the high-magnification optical module as the reference surface when the high-magnification optical module captures the high-magnification image from which the optical characteristic value included in the reference value range of the upper end surface of the sample is extracted;

a foreign substance analysis unit that compares the optical characteristic value extracted from the high-magnification image continuously captured in the foreign substance coordinate area with the foreign substance reference value range, calculates a vertical distance descending from the reference surface of the high-magnification optical module when the high-magnification optical module captures the high-magnification image from which the optical characteristic value included in the foreign substance reference value range is extracted, and determines a depth where the foreign substance exists in the sample; and a determination unit that determines whether the sample is a normal product or a defective product according to the depth where the foreign substance exists.

5. The high-speed automatic film-foreign substance detection apparatus of claim 4, wherein when the sample is a multi-layer film with a base layer and a protective layer adhered to both sides of the base layer, one protective layer that is removed during use is formed to have a larger area than the base layer, a boundary line between the base layer and one protective layer is indicated by a line of light in the low-magnification image by the side light irradiated from the plurality of side light units, an area of interest extraction unit that cuts out the boundary line indicated by the line of light from the low-magnification image and extracts the cut out boundary line as an area of interest is further comprised, and the foreign substance detection unit detects the foreign substance with respect to the area of interest.

6. The high-speed automatic film-foreign substance detection apparatus of claim 4, wherein the foreign substance analysis unit determines a height of the foreign substance by calculating a vertical distance between a starting position of the high-magnification optical module where the optical characteristic value extracted from the continuously captured high-magnification image while the high-magnification optical module descends in the foreign substance coordinate area begins to fall within the foreign substance reference value range and an ending position of the high-magnification optical module where the optical characteristic value extracted from the continuously captured high-magnification image while the high-magnification optical module descends in the foreign substance coordinate area falls last within the foreign substance reference value range.

7. The high-speed automatic film-foreign substance detection apparatus of claim 4, wherein the foreign substance analysis unit measures a distance between foreign substances detected in the low-magnification image, and the determination unit determines whether the sample is a normal product or a defective product in consideration of the size of each detected foreign substance and a perspective of the distance between the foreign substances.

8. The high-speed automatic film-foreign substance detection apparatus of claim 1, wherein the optical characteristic value uses any one selected from an RGB value, a YUV value, an HSB value, and a Lab value, but when the optical characteristic value is used as the RGB value, the following layer detectable maximum index $LDI_{max}$ is calculated and used, and wherein:

$$LDI_{max} = R_{max} \times G_{max} \times B_{max},$$

$R_{max}$: Maximum value among R component values of pixels within a high-magnification image capturing area, $G_{max}$: Maximum value among G component values of pixels within the high-magnification image capturing area, and $B_{max}$: Maximum value among B component values of pixels within the high-magnification image capturing area.

9. The high-speed automatic film-foreign substance detection apparatus of claim 1, wherein the optical characteristic value uses any one selected from an RGB value, a YUV value, an HSB value, and a Lab value, but when the optical characteristic value is used as the RGB value, the following layer detectable minimum index $LDI_{min}$ is calculated and used, and wherein:

$$LDI_{min} = R_{min} \times G_{min} \times B_{min},$$

$R_{min}$: Minimum value among R component values of pixels within a high-magnification image capturing area, $G_{min}$: Minimum value among G component values of pixels within the high-magnification image capturing area, and $B_{min}$: Minimum value among B component values of pixels within the high-magnification image capturing area.

10. The high-speed automatic film-foreign substance detection apparatus of claim 1, further comprising a foreign substance type analyzer that is connected to the high-magnification optical module and determines a kind of foreign substance contained in the sample.

* * * * *